(No Model.) 2 Sheets—Sheet 1.
P. A. RAYMOND.
GLOVE FASTENING.
No. 472,272. Patented Apr. 5, 1892.
Fig. 1.
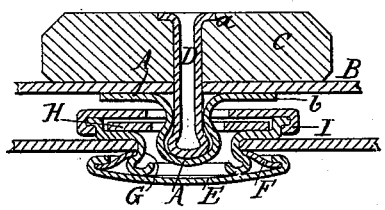
Fig. 2.
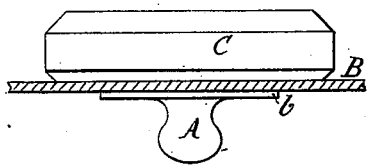
Fig. 3.
Fig. 4.
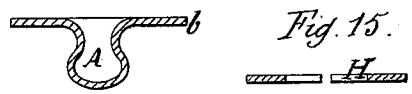
Fig. 5.
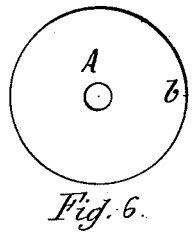
Fig. 6.
Fig. 7.
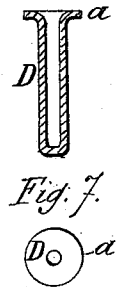
Fig. 8.
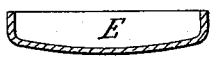
Fig. 9.
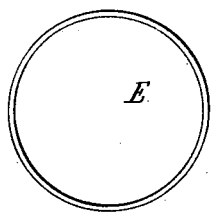
Fig. 10.
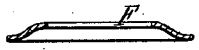
Fig. 11.
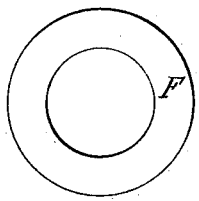
Fig. 15.
Fig. 16.
Fig. 12.
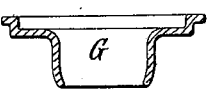
Fig. 13.
Fig. 14.
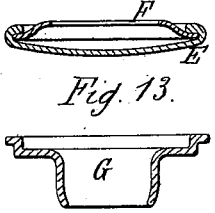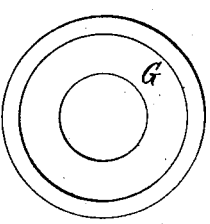
Witnesses:
Chas. A. Walsh
John A. Kenyie
Inventor:
Pierre Albert Raymond
By Henry Connett
Atty (No Model.) 2 Sheets—Sheet 2.
P. A. RAYMOND.
GLOVE FASTENING.
No. 472,272. Patented Apr. 5, 1892.
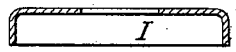
Fig. 17
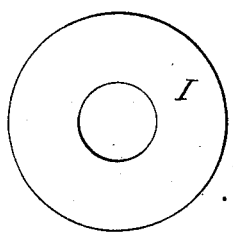
Fig. 18.
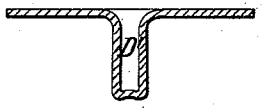
Fig. 23
Fig. 24.
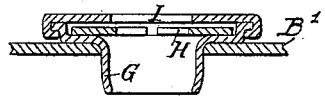
Fig. 19.
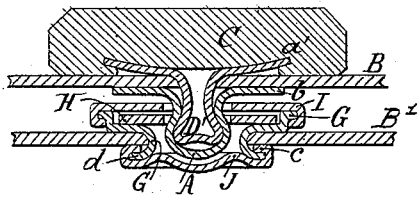
Fig. 20.
Fig. 25
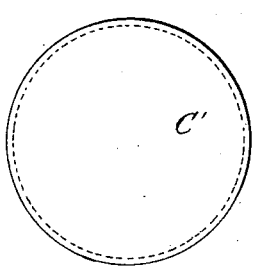
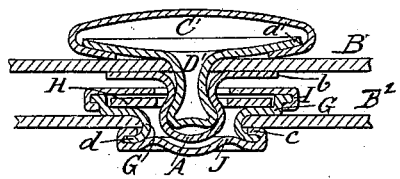
Fig. 21.
Fig. 26.
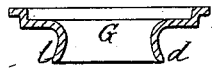
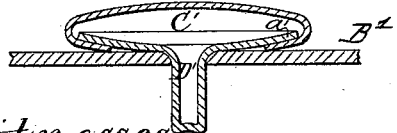
Fig. 22.
Fig. 27.
Fig. 28.
Witnesses:
Chas. A. Walsh
John A. Kenrie
Inventor:
Pierre Albert Raymond
By Henry Connett
Atty

UNITED STATES PATENT OFFICE.

PIERRE ALBERT RAYMOND, OF GRENOBLE, FRANCE.

GLOVE-FASTENING.

SPECIFICATION forming part of Letters Patent No. 472,272, dated April 5, 1892.

Application filed March 16, 1891. Serial No. 385,222. (No model.) Patented in France December 22, 1890, No. 210,349, and in England February 4, 1891, No. 2,070.

*To all whom it may concern:*

Be it known that I, PIERRE ALBERT RAYMOND, a citizen of the French Republic, residing at Grenoble, Isère, France, have invented certain Improvements in Clasps, (for which patents have been granted to me in France, No. 210,349, dated December 22, 1890, and in Great Britain, No. 2,070, dated February 4, 1891,) of which the following is a specification.

My invention relates to the kind of clasps commonly employed on gloves, foot-coverings, gaiters, wearing-apparel, pocket-books, &c., and particularly to that species of clasp where one of the parts of the article is provided with a headed stud or button and the other is provided with a socket-piece to receive and hold the said stud when the fastening shall have been effected.

The characteristic feature of my clasp or fastening device is the inelastic or unyielding character of the headed stud or button and the socket to receive the head on the stud provided with a spring of peculiar construction, which yields to permit the entering head of the button to pass and then closes about the slender neck thereof.

My invention will be fully described hereinafter, and its novel features carefully defined in the claims.

In the accompanying drawings, which illustrate a clasp embodying my improvements, Figure 1 is a sectional elevation of the clasp, showing the two members united. Figs. 2 and 3 are side elevations, respectively, of the superior and inferior members of the clasp, showing them detached. Figs. 4, 5, 6, and 7 are detail views of parts of the superior member of the clasp; and Figs. 8 to 19, inclusive, show details of the inferior member of the clasp. Figs. 20 and 21 are sectional views representing slightly-modified constructions of the clasp, and Figs. 22, 23, 24, 25, 26, 27, and 28 are details of these modified constructions.

Referring to the first nineteen figures of the drawings, the superior member of the clasp, which is attached to the material or fabric B, consists of a headed stud or button A, provided with a broad base *b*, which rests on the material B, and of a shank D, secured at one end to the button A, and at the other end is furnished with a flange *a*, clinched down or bearing upon a washer C, placed at the back of the fabric B.

Fig. 4 is a section, and Fig. 5 a plan, of the button A detached.

Fig. 6 is a section, and Fig. 7 a plan or end view, of the stem D detached.

The button A is struck up hollow, and the stem D thereof is also hollow or tubular. In securing the button to the fabric it is placed on the fabric and the washer C placed on the opposite face thereof. The stem D is passed through the washer and fabric from the back and enters the hollow of the button. Pressure is exerted on the outer flanged end of the stem D, and its inclosed end will be expanded in the enlarged part of the hollow in the button, as seen in Fig. 1, thus forming a head on the stem and firmly securing the button to the fabric. The washer C may be of hard material, as metal, ceramic ware, &c.

The inferior member comprises the following parts: In a shallow cap E (seen in section and plan, respectively, in Figs. 8 and 9) is lodged an embossed washer F. (Seen in section and plan, respectively, in Figs. 10 and 11.) Fig. 12 is a sectional view showing the united cap E and washer F, the latter being confined in place by the inturned flange of the cap. A thimble G (seen in section and plan, respectively, in Figs. 13 and 14) receives in the rabbet at its wider part a triangularly-shaped spring H, consisting of a disk or plate of metal of the proper contour exteriorly to fit into the thimble and having in it a triangular aperture *h*, which is cut through at *h'*. This spring is held in place by an apertured and flanged cap-plate I, (seen in Figs. 17 and 18, respectively, in section and plan detached,) which is placed over the broader end of the thimble G and secured thereto by turning in the flange on its margin. The thimble G, spring H, and cap-plate I are shown united in Fig. 19, which is a sectional view thereof.

In applying the inferior member of the clasp to the fabric the cap E and washer F are united, as seen in Fig. 12, and the thimble G, spring H, and cap-plate I are united, as seen in Fig. 19. The first-named parts are applied to one face of the fabric or material B' and the last-named parts are applied to the other face of the fabric, the lesser extremity of the thimble G passing through an aperture in the fabric and extending into the hollow of the cap E through the washer F. Pressure is applied, which has the effect to expand and clinch the said extremity of the thimble in the cap E, as clearly seen in Fig. 1, and thus secure the two parts together on the fabric.

In the modified construction illustrated in Fig. 20 the stem D' of the button A has a broad flange $a'$, which is expanded into an undercut recess in the washer C. This stem D' is seen in section detached in Fig. 23.

In the modified construction illustrated in Fig. 21 a flanged cap-plate C' is substituted for the washer C, its flange being turned in under the flange $a'$ on the stem D'. This cap-plate C' is represented in section and plan, respectively, in Figs. 24 and 25, and the cap-plate C' and stem D' are shown united in Fig. 22.

In the modified forms of the clasp illustrated in Figs. 20 and 21 there is another minor departure from the construction seen in Fig. 1, which consists in substituting a cap J for the united cap E and embossed washer F. The thimble G is flanged outwardly, and its marginal flange $a'$ is held by the inturned flange $c$ on the cap J.

Figs. 26 and 28 are sectional views, respectively, of the thimble G and cap J, and Fig. 27, which is similar to Fig. 19, shows the thimble G, spring H, and cap-plate I united. The peculiar spring H has a triangular aperture $h$ in it, in Fig. 16, through which the button A must be forced in effecting the fastening, the spring being enabled to expand to allow the button to pass by reason of the open slit $h$. (Seen in Figs. 15 and 16.) The resiliency of the spring allows it to close about the neck of the button.

I am aware that the inferior member of a clasp for this purpose has been furnished with a cut ring, which expands to allow the bulbous head of the button to pass, and this I do not claim. I employ a spring-disk having a triangular aperture so shaped as to touch the entering head only at three equidistant points.

Having thus described my invention, I claim—

1. In a clasp or fastening, the combination, with the superior member of the clasp, having a round-headed button or stud, of the inferior member of said clasp, provided with a retaining-spring H of flat material, having an equilateral triangular aperture to receive the said button, whereby the latter impinges on the said spring at three equidistant points when it is forced through the spring.

2. In a clasp or fastening, the combination, with the inferior member of said clasp, provided with a retaining-spring of flat material, having an equilateral triangular aperture, of the superior member of the clasp, comprising the washer, the closed hollow bulbous flanged button A, and the hollow retaining-shank D, closed at the end where it is expanded into the hollow of the button and having a flange at its other end engaging said washer.

In witness whereof I have hereunto signed my name in the presence of two subscribing witnesses.

PIERRE ALBERT RAYMOND.

Witnesses:
J. MOURATT,
H. BURNS.